United States Patent

Konishi et al.

[11] 3,898,301
[45] Aug. 5, 1975

[54] BLENDS OF THERMOPLASTIC POLYMERS WITH GRAFT COPOLYMERS OF MALEIC ACID DERIVATIVES

[75] Inventors: Kunio Konishi; Tsuneo Tsubakimoto; Masao Nikki, all of Osaka, Japan

[73] Assignee: Nippon Shokubsi Kagaha Kozyo Co. Ltd., Osaka, Japan

[22] Filed: Apr. 10, 1973

[21] Appl. No.: 349,772

[30] Foreign Application Priority Data
Apr. 11, 1972 Japan.............................. 47-35726

[52] U.S. Cl.......... 260/876 R; 260/4 R; 260/45.7 P; 260/45.85; 260/45.95; 260/78.5 UA; 260/78.5 BB; 260/836; 260/878 R; 260/879; 260/880; 260/881; 260/882; 260/883; 260/884; 260/885; 260/886
[51] Int. Cl......................... C08f 15/00; C08f 19/00
[58] Field of Search......... 260/885, 876 R, 78.5 UA

[56] References Cited
UNITED STATES PATENTS
2,958,673  11/1960  Jen..................................... 260/885

*Primary Examiner*—Murray Tillman
*Assistant Examiner*—Richard B. Turer
*Attorney, Agent, or Firm*—Sherman & Shalloway

[57] ABSTRACT

A thermoplastic resin composition comprising (1) a graft copolymer (GP) prepared by graft-copolymerizing at least one ethylenically unsaturated monomer (C) with a substratum polymer (AB) having pendant double bonds prepared from at least one co-monomer (A) expressed by the general formula

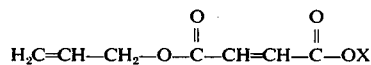

wherein
X is a hydrogen atom, an alkyl group containing 1 to 18 carbon atoms, a hydroxyethyl group, a hydroxypropyl group or an aminoethyl group, and at least one other ethylenically unsaturated monomer (B), and (2) at least one thermoplastic polymer or copolymer (TP).

6 Claims, No Drawings

BLENDS OF THERMOPLASTIC POLYMERS WITH GRAFT COPOLYMERS OF MALEIC ACID DERIVATIVES

This invention relates to a thermoplastic resin composition having superior weatherability, reduced heat discoloration, and high impact strength. More specifically, the invention relates to a thermoplastic polymer composition which is prepared by blending at least one thermoplastic polymer or copolymer with a graft copolymer obtained by employing at least one monomer selected from the group consisting of a monoallyl maleate, monoallyl fumarate and their derivatives.

Styrene, vinyl chloride, methyl methacrylate, and acrylonitrile have been used widely as inexpensive vinyl monomers. However, homopolymers of these monomers or copolymers prepared mainly from these monomers have low impact strength, and cannot be utilized in fields which require high impact strength. In an attempt to remedy this defect, there was proposed a method wherein a monomeric mixture containing the above monomer is polymerized in the presence of a rubbery substance, and the resulting graft copolymer is blended with the above-mentioned homopolymer or copolymer thereby to increase impact strength. For example, high impact polystyrene, high impact polyvinyl chloride, and ABS resins have emerged from such a method, and have been commercially available.

Various methods have been proposed in regard to the method for producing resins having high impact strength. Generally, the so-called chain-transfer graft copolymerization is carried out in which a monomer such as styrene, is polymerized in the presence of a rubbery polymer of a conjugated diene monomer using a peroxide polymerization initiator having a high ability to extract hydrogen. In the chain-transfer graft polymerization, the use of a rubbery polymer of a conjugated diene as a rubbery substance is essential. However, the high impact resins produced by using the conjugated diene rubbery polymers have the serious defect of having almost no weatherability as a result of ozonization or deterioration by ultraviolet rays since they contain unsaturated double bonds within the molecules. Accordingly, in order to improve the weatherability of these resins, methods of grafting various vinyl monomers to the essentially saturated rubbery substances have been proposed in recent years. For example, there were proposed a method in which acrylonitrile and styrene are graft-copolymerized with an acrylic ester rubber and the graft copolymer is blended with an acrylonitrile-styrene copolymer (to form AAS resin), and a method in which a vinyl chloride monomer is graft-copolymerized with an acrylic ester rubber or ethylene/vinyl acetate copolymer, and the graft copolymer is blended with a polyvinyl chloride. Either of these methods have the defect of low graft ratios and low grafting efficiency. For example, when styrene and acrylonitrile are grafted to a rubber consisting mainly of butyl acrylate, the grafting efficiency is only about 20 to 32 %. Accordingly, resin compositions having superior resistances to weather and impact and useful for industrial applications have hardly been marketed.

A primary object of this invention is to provide a thermoplastic resin composition having superior weather-ability and impact strength, for example, an AAS composition, a polyvinyl chloride composition, a polystyrene composition or a polymethacrylate composition.

Other objects of this invention will become apparent from the following description.

According to the present invention, there is provided a thermoplastic resin composition comprising a blend of a thermoplastic polymer or copolymer (TP) with a graft copolymer (GP) which is prepared by copolymerizing at least one comonomer (A) selected from the group consisting of monoallyl maleate, monoallyl fumarate and their derivatives which are expressed by the following general formula

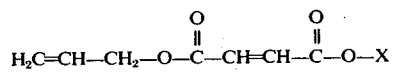

wherein
X is H, $-CH_2-CH_2-OH$, $-CH_2-CH(CH_3)-OH$, $-CH(CH_3)-CH_2-OH$, $-CH_2-CH_2-NH_2$, or an alkyl group containing 1 to 20 carbon atoms with an other ethylenically unsaturated monomer (B) thereby to form a substratum copolymer (AB) having pendant double bonds, and graft-copolymerizing at least one ethylenically unsaturated monomer (C) with said substratum copolymer (AB).

The term "substratum copolymer" denotes a copolymer usually called "trunk polymer."

In another embodiment of the present invention, the desired thermoplastic resin composition can be provided by graft-copolymerizing at least one comonomer (A) and at least one other ethylenically unsaturated monomer (B) with a copolymer (AB-1) of at least one comonomer (A) and at least one other ethylenically unsaturated monomer (B), thereby to form a graft copolymer (AB) having pendant double bonds (i.e., substratum copolymer), then graft-copolymerizing at least one other monomer (C) with the resulting graft copolymer (AB) to form a copolymer having a multi-grafted structure, and then blending the resulting multi-grafted copolymer with a thermoplastic resin.

Examples of the comonomer (A) are monoallyl maleate (hereinafter abbreviated as MAM), monoallyl fumarate, monoallyl-mono-2-hydroxyethyl maleate, monoallyl-mono-2-hydroxyethyl fumarate, monoallyl-mono-2-hydroxypropyl maleate, monoallyl-mono-2-hydroxypropyl fumarate, monoallyl-mono-2-aminoethyl maleate, monoallyl-2-aminoethyl fumarate, monoallyl-monomethyl maleate, monoallyl-monomethyl fumarate, allyl-ethyl maleate, allyl-ethyl fumarate, allyl-propyl maleate, allyl-propyl fumarate, allyl-butyl maleate, allyl-butyl fumarate, allyl-octyl maleate, and allyl-octyl fumarate. Especially, MAM that can readily be prepared by reacting equimolar amounts of allyl alcohol and maleic anhydride is used effectively.

Substratum copolymers (AB) can be obtained by copolymerizing at least one comonomer (A) expressed by the above general formula with another ethylenically unsaturated monomer (B), and the latter monomer (B) is the main component of the copolymer (AB). The ethylenically unsaturated monomer (B), which is the main component of the substratum copolymer (AB) (hereinafter referred to as "main component monomer (B)"), includes, for example, alkyl acrylates having 1 to 18 carbon atoms in the alkyl portion such as methyl acrylate, ethyl acrylate, propyl acrylate, butyl acrylate and 2-ethyl-hexyl acrylate; aralkyl acrylates; alkyl methacrylates having 1 to 18 carbon atoms in the alkyl portion such as methyl methacrylate, ethyl methacrylate, propyl methacrylate, butyl methacrylate and 2-ethyl-hexyl methacrylate; aralkyl methacrylates; acrylic acid derivatives or methacrylic acid derivatives such as cyclohexyl acrylate, glycidyl methacrylate, N-alkoxymethyl-acrylamide, N-alkoxymethyl-methacrylamide; and ethylenically unsaturated monomers such as acrylonitrile, methacrylonitrile styrene, α-methyl styrene, halogenated styrene, divinyl benzene, vinyl chloride, vinylidene chloride, alkyl vinyl ethers having 1 to 8 carbon atoms in the alkyl portion, vinyl acetate, ethylene, butadiene, isoprene, diallyl phthalate, diacrylates of glycols having 2 to 8 carbon atoms in the glycol portion such as ethylene glycol diacrylate, butylene glycol diacrylate, or diethylene glycol diacrylate; dimethacrylates of glycols having 2 to 8 carbon atoms in the glycol portion such as ethylene glycol dimethacrylate, butylene glycol dimethacrylate or diethylene glycol dimethacrylate; trimethylol-propane trimethacrylate, dialkyl esters of maleic acid and of fumaric acid having 1 to 8 carbon atoms in the alkyl portion.

For some purposes, it is possible to employ two or more ethylenically unsaturated monomers as the main monomer component (B). For instance, a mixture of 0.1 to 20.0 % by weight of a comonomer (A), 50.0 to 99.9 % by weight of at least one ethylenically unsaturated monomer (B-1) selected from alkyl acrylates having 1 to 12, preferably 2 to 8 carbon atoms in the alkyl portion and 0.0 to 49.9 % by weight of at least one other ethylenically unsaturated monomer (B-2) can be used as the monomers constituting the substratum polymer (AB). Butyl acrylate and 2-ethylhexyl acrylate are the especially preferred alkyl acrylates used as component (B-1).

Substratum copolymers (AB) can be prepared by reacting mixtures of at least one comonomer (A) expressed by the above general formula and at least one main component monomer (B) by customary polymerization methods such as the emulsion polymerization method, the suspension polymerization method and the solution polymerization method.

For example, when the substratum copolymer (AB) is prepared by the emulsion polymerization method, to a mixture of water, an emulsifier and a polymerization initiator is added a mixture of at least one comonomer (A) expressed by the above general formula and at least one main component monomer (B), and if desired, a salt, a pH-adjusting agent, a chain transfer agent and other additive are further added. Thus, the emulsion polymerization can be conducted according to known procedures. Examples of the emulsifier to be used include fatty acid salts, hydrogenated rosin acid salts, salts of higher alcohol-sulfuric acid esters, alkylbenzene sulfonic acid salts, alkylnaphthalene sulfonic acid salts, naphthalene sulfonic acid-formalin condensates, dialkylsulfosuccinic acid salts, polyoxyethylene alkyl sulfates, polyoxyethylene alkyl ethers, polyoxyethylene alkylaryl ethers, sorbitan fatty acid esters, polyoxyethylene sorbitan fatty acid esters, polyoxyethylene amyl esters, oxyethylene-oxypropylene polymers and fatty acid monoglycerides. These emulsifiers can be used singly or in mixture of two or more.

Suitable examples of the polymerization initiator are peroxide compounds such as persulfates, hydrogen peroxide, perborates, benzoyl peroxide, cumene peroxide, caproyl peroxide, tert-butyl hydroperoxide and di-isopropylbenzene hydroperoxide; redox catalysts composed of such a peroxide as exemplified above and a reducing agent such as ascorbic acid, soluble sulfites, hydrosulfites, sulfoxylates and thiosulfates; and free radical-forming compounds such as azobisisobutyronitrile. The polymerization can also be initiated by employing ionizing radiation instead of polymerization initiators.

The pH-adjusting agent may, for example, be ammonia, sodium hydroxide, potassium hydroxide, ethanol amine, diethanol amine, ethylene diamine and phosphates.

The amount of the comonomer (A) of the above general formula such as MAM is determined depending on the kind of the desired graft copolymer and can be varied within a broad range. For instance, when a monomeric mixture (C) of acrylonitrile and styrene is graft-copolymerized with an acrylic ester rubber (AB) for the purpose of preparing a graft copolymer (GP), the content of the comonomer (A) in the starting monomers of the acrylic ester rubber needs to be adjusted to 0.1 to 20 % by weight, preferably 1 to 10 % by weight, in order to prepare graft copolymer (GP) having excellent physical properties.

The polymerization temperature, pressure and time are not critical, and conditions suitable for obtaining the desired substratum polymer are chosen. For instance, the polymerization temperature is determined depending on the activities of monomers, the kind of catalyst used and the desired substratum polymer, may be varied within a range of from 0° to 130°C. or higher. The polymerization reaction can be conducted under atmospheric or elevated pressure and preferably, it is carried out in an inert atmosphere.

The substratum polymer (AB) so obtained has pendant double bonds, and whether the resulting polymer (AB) is cross-linked or not is determined according to the kind of the main component monomer (B) used.

Comonomers (A) expressed by the above general formula have two kinds of double bonds, one being derived from allyl alcohol (hereinafter referred to merely as "allyl double bond") and the other being derived from maleic acid or fumaric acid (hereinafter referred to merely as "maleic double bond"). Of these kinds of double these the allyl double bond, like an allyl double bond in an allyl compound such as allyl acetate and diallyl phthalate, can react smoothly with vinyl acetate, vinyl chloride or the like, but it does not react smoothly with styrene, methyl methacrylate or the like. The reactivity of the maleic double bond is quite different from the above reactivity of the allyl double bond. More specifically, the maleic double bond, like a double bond in maleic acid anhydride, copolymerizes quite readily with styrene, vinyl chloride, or the like and is able to react with an acrylic acid ester.

Accordingly, when, for instance, an acrylic acid ester as the main component monomer (B) is copolymerized with, for instance, monoallyl maleate as the subsidiary monomer component (A) under suitable polymerization conditions, an acrylic ester rubber containing a suitable amount of pendant double bonds, namely substratum polymer (AB), can be obtained. In such a case, as for part of monoallyl maleate (A) both kinds of double bonds participate in the copolymerization reaction, and as a result, the cross linkage is formed in the molecule of the substratum polymer (AB). In order to improve the impact resistance of polymer compositions, it is essential that such cross linkage should be present to some extent in the molecule of the substratum polymer (AB). In this invention, the amount of the cross linkage can readily be increased or decreased optionally by changing the polymerization conditions according to known procedures.

For instance, when a butyl acrylate rubber as substratum polymer (AB) is prepared by emulsion polymerizing butyl acrylate as the main component monomer (B) with MAM as the comonomer (A), owing to the presence of the hydrophilic carboxylic group, MAM is more densely distributed near the surface of the emulsion particles and at the surface of the particles, the carboxylic group is directed toward the water phase and allyl group is directed toward the monomer phase; therefore maleic double bonds are difficult to participate in the copolymerization, whereas the allyl group participates in the copolymerization in the interior of the emulsion particles, with the consequence that the resulting substratum polymer still contains unreacted maleic double bonds.

This is considered to be the reason why a graft copolymer can be produced with an arbitrary graft ratio and a far higher grafting efficiency than in the conventional method especially when MAM is used in the present invention.

When a polystyrene latex, a polyvinyl chloride latex, an ethylene-vinyl acetate copolymer latex, a polybutadiene latex, a natural rubber latex or the like is present as the seed latex in preparing the substratum polymer, it is possible to form a substratum polymer having the internal nucleus composed of such a seed latex.

As the ethylenically unsaturated monomer (C) to be grafted to the substratum polymer (AB) (hereinafter referred to as "graft-monomer"), monomers capable of being graft-copolymerized with pendant double bonds of the substratum polymer are used. Examples of such monomer include alkyl acrylate having 1 to 18 carbon atoms in the alkyl portion, such as methyl acrylate, ethyl acrylate, propyl acrylate, butyl acrylate, isobutyl acrylate, and 2-ethylhexyl acrylate; alkyl methacrylates having 1 to 18 carbon atoms in the alkyl portion, such as methyl methacrylate, ethyl methacrylate, propyl methacrylate, butyl methacrylate, isobutyl methacrylate, 2-ethylhexyl methacrylate, isodecyl methacrylate, lauryl methacrylate, tridecyl methacrylate and stearyl methacrylate; acrylonitrile, methacrylonitrile; styrene, α-methyl styrene, halogenated styrene; vinyl chloride and vinyl acetate; di-alkyl esters of maleic acid and of fumaric acid containing 1 to 8 carbon atoms in the alkyl group, such as dibutyl maleate and dibutyl fumarate; maleimides. These monomers can be used either singly or in admixture of two or more.

The especially preferred graft monomers (C) used in this invention are mixtures of 50.0 to 100 % by weight of at least one ethylenically unsaturated monomer (C-1) selected from the group consisting of styrene, vinyl chloride, acrylonitrile and methyl methacrylate and 0.0 to 50.0 % by weight of at least one other ethylenically unsaturated monomer (C-2). Since graft copolymers obtained by using these graft monomers have good compatibility with thermoplastic polymers or copolymers prepared from styrene, vinyl chloride, acrylonitrile, methyl acrylate or mixtures of these, thermoplastic resin compositions obtained by blending both of these components have excellent properties.

The process for the graft copolymerization of the monomer (C) to the substratum polymer (AB) is not particularly critical in this invention. Known emulsion polymerization, suspension polymerization and bulk polymerization can be employed conveniently. The solution polymerization technique can also be used. For instance, following the procedure for preparing the substratum polymer (AB) according to the emulsion polymerization method, at least one graft-monomer (C) is added to the polymerization system, if necessary together with water, an emulsifier, a polymerization initiator, a pH adjusting agent, a chain transfer agent, etc., and the graft copolymerization is carried out under prescribed conditions, whereby a graft copolymer of the desired graft ratio can be obtained at a high grafting efficiency. Known emulsifiers and polymerization initiators, such as mentioned with respect to the emulsion polymerization for the preparation of the substratum polymer (AB), can be used effectively also for this graft copolymerization.

Furthermore, a mixture comprising at least one comonomer (A) and at least one main component monomer (B) can also be used as the graft-monomer (C) in this invention. In this case, a graft copolymer having pendant double bonds derived from the comonomer (A) is obtained. When a monomer or a mixture of two or more monomers is further grafted to the resulting copolymer, a graft copolymer having a multi-layer structure can be obtained.

The thermoplastic polymer or copolymer (TP) used in the present invention may be those having compatibility or affinity with the branch portion of the graft copolymer, and include, for example, an acrylonitrile/styrene copolymer, acrylonitrile/styrene/α-methyl styrene copolymer, polystyrene, polymethyl methacrylate, polyvinyl chloride, vinyl chloride copolymers, styrene/maleimide copolymer, styrene/maleic anhydride copolymer, polycarbonate, and acrylonitrile/acrylate ester copolymer. The preferred thermoplastic polymer or copolymer (TP) is one prepared from 50.0 to 100 % by weight of at least one monomer (D-1) selected from the group consisting of styrene, vinyl chloride, acrylonitrile and methyl methacrylate and 0 to 50.0 % by weight of at least one other ethylenically unsaturated monomer (D-2).

Blending of the graft copolymer and the thermoplastic resin can be performed by various methods, examples of which are a method wherein the graft copolymer and the thermoplastic resin are mixed in the form of latex followed by salting out, and a method wherein the graft copolymer and the thermoplastic resin are mechanically mixed. If there is used a method of polymerizing a monomer which is capable of giving a thermoplastic resin, by adding the monomer to a substratum polymer latex and upon further addition, if desired, of a chain transfer agent, the production of the graft copolymer (GP), the polymerization of the thermoplastic resin (TP), and the blending of both of them can be carried out in one stage.

The amount of the graft copolymer to be blended with the thermoplastic polymer or copolymer varies widely depending upon the character of the graft copolymer, the character of the thermoplastic polymer or copolymer, and the physical characteristics desired in the final product.

In order to prepare the thermoplastic resin composition of this invention, it is preferred to blend 2 to 60 % by weight of the graft copolymer with 40 to 98 % by weight of the thermoplastic polymer or copolymer. If the amount of the graft copolymer is less than 2 % by weight, the thermoplastic resin composition does not possess the improvements intended by the present invention. Furthermore, if the amount of the graft copolymer exceeds 60 % by weight, the thermoplastic resin composition does not show the properties of the thermoplastic resin.

Certain stabilizers may be added to the blends. Other additives usable in the present invention may include certain processing aids, lubricants, colorants, fillers, plasticizers and the like.

Typical examples of the thermoplastic resin composition of this invention are given below.

1. A resin composition comprising a blend of a styrene/acrylonitrile copolymer or methyl methacrylate polymer (TP) with a graft copolymer (GP) prepared by grafting styrene, a mixture of styrene and acrylonitrile, methyl methacrylate, or a mixture of methyl methacrylate and another monomer to an acrylic ester rubber composed mainly of butyl acrylate or 2-ethylhexyl acrylate (this resin composition has both excellent mechanical properties and weatherability).

2. A resin composition comprising a blend of a polyvinyl chloride resin (TP) and a graft copolymer (GP) prepared by grafting vinyl chloride to an acrylic ester rubber. If the amount of the graft copolymer is relatively small, this resin composition is hard and has excellent impact resistance, and if the amount of the graft copolymer is relatively large, the resin composition has good pliability. Since the compatibility between the graft copolymer and the polyvinyl chloride in this resin composition is good and the blended grafted copolymer does not escape from the composition, the above properties of the composition can be maintained for prolonged periods of time.

3. A resin composition comprising a blend of an acrylonitrile/methyl acrylate copolymer (TP) with a graft copolymer (GP) prepared by graft-copolymerizing acrylonitrile and methyl acrylate with an acrylic ester rubber. This resin composition has good weatherability, impact strength, solvent resistance and resistance against permeation of carbon dioxide and oxygen gas, and remains stable over considerably long periods of time even in the absence of a stabilizer.

4. A resin composition comprising a blend of polyvinyl chloride (TP) with a graft copolymer (GP) prepared by graft-copolymerizing vinyl chloride with a low molecular weight (liquid) copolymer of MAM and an acrylic acid ester. This resin composition has excellent properties as soft polyvinyl chloride.

The invention will be illustrated in detail below by Examples and Referential Examples. It is to be noted that the invention is not limited to these examples. In these Examples and Referential Examples, all parts are by weight unless otherwise specified. Furthermore, the term "latex" in the above description and in the following Examples denotes an aqueous dispersion of a polymer.

The values of "grafting efficiency" and "graft ratio" are those calculated according to the following equations:

$$\text{Grafting Efficiency (\%)} = \frac{\text{(weight of branch polymer grafted to substratum polymer)}}{\text{(weight of monomer fed for graft polymerization)} \times \text{conversion (\%)} \times 1/100} \times 100$$

$$\text{Graft Ratio (\%)} = \frac{\text{(weight of branch polymer grafted to substratum polymer)}}{\text{(weight of substratum polymer)}} \times 100$$

Referential Example 1

A four-neck flask equipped with a thermometer, a stirrer, an inert gas inlet and a condenser was charged with 29 g (0.5 mole) of allyl alcohol and 48.6 g (0.495 mole) of maleic anhydride, and when the temperature was elevated to 45°C. in a nitrogen current, maleic anhydride was completely dissolved. The reaction was carried out for 4 hours while heating at 45°C., and the reaction mixture was distilled under reduced pressure to remove excessive allyl alcohol. Thus, colorless liquid monoallyl maleate (MAM) was obtained almost quantitatively.

The purity of the ester so obtained was measured according to the alkali titration method, and found to be 99.6 %.

Referential Example 2

An Erlenmeyer flask equipped with a stopper was charged with 51.1 g (0.520 mol) of maleic anhydride and 16.7 g (0.521 mol) of methanol. The mixture was heated for 2 hours in a warm water bath maintained at 41°C. and then allowed to stand overnight at room temperature. Next day, the alkalimetry of the mixture was performed and it was found that monomethyl maleate was obtained at a conversion of 99 %.

To the monomethyl maleate were added 30.2 g (0.520 mol) of allyl alcohol, 1.0 g of p-toluene sulfonic acid, 0.1 g of hydroquinone and 130 ml of benzene. While removing water produced during the esterification reaction, the resulting mixture was heated under reflux for 4 hours, followed by evaporation under reduced pressure to remove benzene. The remaining product was distilled to obtain a 23 g of colorless liquid of monoallyl monomethyl maleate as a fraction boiling at 88° – 93°C./3 mmHg.

The elementary analysis values of this fraction were substantially identical to its theoretical values as shown below.

Found: H: 6.05 %, C: 56.3 %
Calculated: H: 5.93 %, C: 56.50 %

Example 1 a. Preparation of Substratum Polymer (Butyl Acrylate Rubber Latex):

A glass reactor equipped with a thermometer, a stirrer, a dropping funnel, an gas inlet tube and a condenser was charged with 200 parts of deionized water, 3.0 parts of sodium lauryl sulfate and 0.4 part of potassium persulfate, and the inside atmosphere of the reactor was replaced by nitrogen. In a nitrogen atmosphere a monomeric mixture composed of 100 parts (89.3 %) of butyl acrylate, 8 parts (7.1 %) of acrylonitrile and 4 parts (3.6 %) of MAM was added dropwise to the charge of the reactor under agitation at a temperature maintained at about 70°C. over a period of 21 minutes. After completion of the dropwise addition, the reaction mixture was agitated at 70°C. for 60 minutes, and cooled to room temperature. A small amount of a coagulated matter was separated by filtration and 309 parts of a latex was obtained.

The conversion of the monomer was calculated from the solids content of the latex so obtained, was found to be 95 %.

b. Preparation of Graft Copolymer:

The same reactor as used in (a) above was charged with 100 parts of the polymer latex obtained in (a) above, 50 parts of deionized water, 0.67 part of sodium lauryl sulfate and 0.30 part of potassium persulfate. Then, the inside atmosphere of the reactor was replaced by nitrogen, and in a nitrogen atmosphere a monomeric mixture composed of 15.7 parts of styrene and 6.7 parts of acrylonitrile was added dropwise to the charge of the reactor at a temperature maintained at 65°C. over a period of 26 minutes. After completion of the dropwise addition, the reaction mixture was agitated at 65°C. for 4 hours to polymerize the monomeric mixture almost completely.

c. Preparation of Thermoplastic Resin (Acrylonitrile-Styrene Copolymer Latex):

The same reactor as used in (a) above was charged with 1000 parts of deionized water, 12.5 parts of myristic acid, 3.1 parts of potassium hydroxide, 1 part of a sodium salt of a naphthalene sulfonic acid-formaldehyde condensate, 2.5 parts of tripotassium phosphate and 1.5 parts of potassium persulfate. The inside atmosphere of the reactor was replaced by nitrogen, and in a nitrogen atmosphere a mixture composed of 350 parts of styrene, 150 parts of acrylonitrile and 2.5 parts of tertiary docecylmercaptan was added dropwise to the charge of the reactor at a temperature maintained at 65°C. over a period of 1 hour. After completion of the dropwise addition, the reaction mixture was agitated at 65°C. for 3 hours to obtain a styrene-acrylonitrile copolymer latex in a yield of 99 %.

d. Preparation of Thermoplastic Resin Composition (AAS):

103.1 parts (33.5 parts as polymer) of the acrylonitrile-styrene copolymer latex obtained in (c) above, 51.1 parts (16.5 parts as polymer) of the graft copolymer latex obtained in (b) above and 0.3 part of 4,4'-butylidene-bis-(6-tert-butyl-3-cresol) were mixed in the latex state, and the mixture was added dropwise to dilute sulfuric acid heated to 80°C. The resulting precipitates were washed with deionized water and dried under reduced pressure at 50°C. to obtain a colorless powdery thermoplastic resin composition (AAS).

In order to stabilize this powdery AAS, 0.3 %, based on the polymer, of trinonylphenyl phosphite and 0.6 %, based on the polymer, of dilauryl thiodipropionate were incorporated in the powdery polymer. The stabilized AAS was kneaded for 10 minutes by means of a hot roll maintained at 200°C. and molded by means of a hot press maintained at 200°C. to obtain a white opaque film having a good toughness. Even when the film so obtained was pressed at 200°C. for 6 hours in air, no gelatin was observed gelation the film was as thermoplastic and tough as prior to the pressing.

The above-mentioned stabilized AAS was pelletized by means of an extruder, and the resulting pellets were injection molded at 200°C. under a pressure of 200 Kg/cm² to obtain test specimens. The mechanical properties of the so obtained test specimens were measured at 23°C. The test specimens were exposed to a Sunshine Weather-O-Meter (Toyo Rika K.K., WE-SUN-HC type, black panel temperature, about 63°C.; Arc Electric voltage, 125 – 140 V; spray cycle, 18/120 min.; spray gauge pressure 1 Kg/cm²) for 500 hours, and then the mechanical properties were measured. The results are shown in Table 1.

Table 1

| Mechanical properties | Values at 23°C. | Values after exposure to Weather-O-meter |
|---|---|---|
| Tensile strength* (kg/cm²) | 390 | 381 |
| Izod impact strength** (kg.cm/cm²) | 20 | 18.4 |
| Bending strength*** (kg/cm²) | 550 | 534 |

*measured according to the method of ASTM D-638
**measured according to the method of ASTM D-256
***measured according to the method of ASTM D-790 e. Measurement of Grafting Efficiency:

A part each of the latices obtained in (a) and (b) above was salted out according to customary procedures, and the precipitates were washed with deionized water, and dried in vacuo at 55°C. for 48 hours to obtain an acrylic ester rubber and a powdery graft copolymer.

The acrylic ester rubber and powdery graft copolymer so obtained were extracted with acetone according to the method of B. D. Gesner disclosed in Journal of Polymer Science, Part A, Vol. 3, pages 3,825 – 3,827 (1965).

In the case of the acrylic ester rubber 97.0 % was left unextracted. This means that the MAM-containing acrylic ester rubber was substantially completely cross-linked. in the case of the powdery graft copolymer, 97.0 % was left unextracted. The grafting efficiency of acrylonitrile-styrene in the polymerization reaction (b) was calculated from these values, and it was found that the grafting efficiency was 97 % (92 % if it is supposed that the substratum polymer in the graft copolymer was completely insoluble). Thus, it was confirmed that the graft copolymerization was conducted with very high efficiency.

Example 2 a. Preparation of Substratum Polymer (Butyl Acrylate Rubber Latex):

A substratum polymer latex was prepared under the same conditions as adopted in (a) of Example 1. A conversion of the monomers was about 94 %.

b. Graft Copolymerization:

A stainless autoclave was charged with 100 parts (33.4 parts as polymer) of the substratum polymer latex obtained in (a) above, 50 parts of deionized water, 0.22 part of sodium lauryl sulfate, 0.30 part of potassium persulfate and 0.11 part of tripotassium phosphate, and the inside atmosphere of the autoclave was replaced by nitrogen. Then, 22.4 parts of vinyl chloride was introduced into the autoclave under pressure, and the mixture was agitated at 65° – 70°C. for 3.5 hours to perform a graft copolymerization. Thus there was obtained a copolymer latex.

The latex so obtained was salted out and post treatments were carried out in the same manner as in (e) of Example 1 to obtain 54.9 parts of a powdery polymer.

c. Measurement of Grafting Efficiency:

The substratum polymer and graft copolymer obtained in (a) and (b) above were extracted with tetrahydrofuran in the same manner as described in (e) of Example 1. When the grafting efficiency was calculated from the unextracted remaining portions, it was found that the grafting efficiency was 94.0 % (91 % if it is supposed that the substratum polymer in the graft copolymer was completely insoluble).

d. Preparation of Thermoplastic Resin Composition (Impact Resistant Polyvinyl Chloride):

25 parts of the powdery graft copolymer obtained in (b) above, 100 parts of a commercially available vinyl chloride polymer (product having an average degree of polymerization of 1030, manufactured by Chisso Kabushiki Kaisha) and 3 parts of a stabilizer of the tin type were mixed together to obtain a thermoplastic resin composition. The resin composition was kneaded for 5 minutes by means of a hot roll maintained at 190°C. and molded into a film by means of a hot press maintained at 190°C. An opaque tough film with the graft copolymer uniformly dispersed therein was obtained.

The above thermoplastic resin composition was pelletized by means of an extruder, and the resulting pellets were press molded at 160°C. under pressure of 50 – 200 kg/cm² for 5 minutes to obtain a test specimen. The Izod impact strength of the test specimen, measured in accordance with the method of ASTM D-256, was 28 kg.cm/cm².

Example 3 a. Graft Copolymerization:

The same reactor as used in (a) of Example 1 was charged with 70 parts (23.4 parts as polymer) of the substratum polymer latex obtained in (a) of Example 2, 50 parts of deionized water, 0.67 part of sodium lauryl sulfate and 0.3 part of potassium persulfate, and in a nitrogen atmosphere 22.4 parts of methyl methacrylate was added dropwise to the charge of the reactor over a period of 25 minutes at a temperature maintained at 65°C. After completion of the dropwise addition, the reaction mixture was agitated at 65°C. for 4 hours to obtain a copolymer latex.

The latex so obtained was salted out and post treatments were carried out in the same manner as in (e) of Example 1 to obtain 45.6 parts of a powdery polymer.

b. Measurement of Grafting Efficiency:

The substratum polymer and graft copolymer obtained in (a) of Example 2 and (a) above were extracted with acetone in the same manner as in (e) of Example 1. The grafting efficiency, determined from the unextracted remaining portions, was 65.1 % (62.4 % if it is supposed that the substratum polymer in the graft copolymer was completely insoluble).

c. Preparation of Thermoplastic Resin Composition (Impact Resistant Polyvinyl Chloride):

10 parts of the powdery graft copolymer obtained in (a) above, 90 parts of a commercially available vinyl chloride polymer and 2.5 parts of a stabilizer of the tin type were mixed together to obtain a thermoplastic resin composition. The resin composition was molded into a film in the same manner as in (d) of Example 2 to obtain an opaque tough film in which the graft copolymer was uniformly dispersed.

The above-mentioned thermoplastic resin composition was treated in the same manner as in (d) of Example 2 to obtain a molded product. The Izod impact strength of the resulting molded product was measured and its result was 24 kg.cm/cm².

Example 4 a. Preparation of Substratum Polymer (Latex of Cross-Linked Styrene Copolymer Containing MAM):

The same reaction as employed in (a) of Example 1 was charged with 200 parts of deionized water, 3.0 parts of sodium lauryl sulfate and 0.4 part of potassium persulfate, and in a nitrogen atmosphere a monomer mixture composed of 94 parts of styrene, 4 parts of MAM and 2 parts of commercially available divinyl benzene (containing 55 % of divinyl benzene, the balance being mainly composed of a mixture of ethylvinyl benzene and diethyl benzene) was added dropwise to the charge of the reactor over a period of 19 minutes at a temperature maintained at 70°C. After completion of the dropwise addition, the reaction mixture was agitated at 70°C. for 90 minutes to obtain a substratum polymer latex. The conversion of the monomeric mixture was 98 %.

b. Preparation of Double Graft Copolymerization:

The same reactor as employed in (a) of Example 1 was charged with 60 parts (19.4 parts as polymer) of the substratum polymer latex obtained in (a) above, 70 parts of deionized water, 0.9 part of sodium lauryl sulfate and 0.15 part of potassium persulfate, and in a nitrogen atmosphere a monomeric mixture composed of 30 parts of n-butyl acrylate and 1.16 parts of MAM was added dropwise to the charge of the reactor over a period of 18 minutes at a temperature maintained at 70°C. After completion of the dropwise addition, the reaction mixture was agitated at 70°C. for 60 minutes to obtain a graft copolymer latex.

Subsequently, the reactor containing the above graft copolymer latex was charged with 60 parts of deionized water, 0.1 part of sodium lauryl sulfate and 0.3 part of potassium persulfate, and in a nitrogen atmosphere a monomer mixture composed of 21 parts of styrene and 9 parts of acrylonitrile was added dropwise to the charge of the reactor over a period of 11 minutes at a temperature maintained at 65°C. After completion of the dropwise addition, the reaction mixture was agitated at 65°C. for 3.5 hours to obtain a graft copolymer latex. The conversion of the monomers was about 96 %.

c. Measurement of Grafting Efficiency:

A part of the styrene copolymer latex obtained in (a) above and a part of double graft copolymer obtained in (b) above were extracted with acetone in the same manner as described in (e) of Example 1. The unextracted remaining portions were 100 % and 98.4 %, respectively, from which the grafting efficiency in the whole double graft copolymerizations was calculated as 97.7 %.

d. Preparation of Thermoplastic Resin Composition (AAS):

103 parts (33.5 parts as polymer) of the acrylonitrile-styrene copolymer latex obtained in (c) of Example 1, 54 parts (16.5 parts as polymer) of the double graft copolymer latex obtained in (b) above and 0.3 part of 4,-4-butylidene-bis-(6-tert.-butyl-3-cresol) were mixed in the latex state, and the mixture was added dropwise to dilute sulfuric acid heated to 80°C. The resulting precipitate was washed with deionized water and dried under reduced pressure at 50°C. to obtain a colorless powdery thermoplastic resin composition (AAS).

The thermoplastic resin composition thus obtained was stabilized in the same manner as described in (d)

of Example 1, and the test specimens were prepared also in the same manner as in (d) of Example 1. The mechanical The of the test specimens were measured to obtain the results as shown in Table 2.

Table 2

| | |
|---|---|
| Tensile strength: | 384 Kg/cm$^2$ |
| Izod impact strength: | 23 Kg.cm/cm$^2$ |
| Bending strength: | 540 Kg/cm$^2$ |

Example 5 a. Preparation of Styrene Copolymer Latex Core:

The same reactor as used in (a) of Example 1 was charged with 200 parts of deionized water, 2.6 parts of sodium dedecylbenzene sulfate, 0.156 parts of potassium persulfate and 0.624 part of sodium hydrogen sulfite, and the inside atmosphere of the reactor was replaced by nitrogen. In a nitrogen atmosphere a monomeric mixture composed of 76 parts of styrene, 24 parts of acrylonitrile and 4 parts of allyl methyl maleate was added dropwise to the charge of the reactor under agitation over a period of 20 minutes at a temperature maintained at 35°C., and the reaction mixture was further agitated at 35°C. for 4 hours to obtain a copolymer latex. The conversion of the monomers was about 96 %.

b. Preparation of Substratum Polymer (Acrylic Rubber Latex Having Styrene Copolymer Core):

The same reactor as used in (a) of Example 1 was charged with 200 parts (64.4 parts as polymer) of the latex obtained in (a) above, 100 parts of deionized water, 0.14 part of potassium persulfate and 0.276 part of sodium hydrogen sulfite. Then, the inside atmosphere of the reactor was replaced by nitrogen, and a monomeric mixture composed of 60 parts of butyl acrylate, 4.8 parts of acrylonitrile and 2.4 parts of MAM was added dropwise to the charge of the reactor over a period of 13 minutes, and the reaction mixture was agitated at 35°C. for 3 hours. The monomers polymerized almost quantitatively.

c. Preparation of Graft Copolymer (Acrylic Rubber Latex Graft Copolymer Having Styrene Copolymer Core):

To 200 parts of the latex obtained in (b) above were added 100 parts of water, 1.38 parts of sodium dodecylbenzene sulfate, 0.14 part of potassium persulfate and 0.376 part of sodium hydrogen sulfite. A mixture of 35 parts of styrene and 11 parts of acrylonitrile was added dropwise to the resulting mixture over a period of 14 minutes at temperature maintained at 35°C., and then the mixture was agitated at 35°C. for 4 hours to obtain a graft copolymer latex. The monomers almost completely polymerized.

d. Preparation of Thermoplastic Resin Composition (AAS):

103 parts (33.5 parts as polymer) of the styrene-acrylonitrile copolymer latex obtained in (c) of Example 1, 48 parts (17 parts as polymer) of the graft copolymer latex obtained in (c) above and 0.3 part of 4,4-butylidene-bis-(6-tert.-butyl-3-cresol) were mixed in the latex state, and the mixture was added dropwise to dilute sulfuric acid heated to 80°C. The resulting precipitate was washed with deionized water and dried to obtain a colorless powdery thermoplastic resin composition.

The thermoplastic resin composition thus obtained was stabilized in the same manner as described in (d) of Example 1, and test specimens were prepared also in the same manner as in (d) of Example 1. The mechanical properties of the test specimens were measured to obtain the results as shown in Table 3.

Table 3

| | |
|---|---|
| Tensile strength: | 394 Kg/cm$^2$ |
| Izod impact strength: | 21 Kg.cm/cm$^2$ |
| Bending strength: | 558 Kg/cm$^2$ |

Example 6 a. Preparation of Methacrylic Resin Latex:

The same reactor as employed in (a) of Example 1 was charged with 640 parts of deionized water, 8 parts of sodium lauryl sulfate and 3 parts of potassium persulfate, and the inside atmosphere of the reactor was replaced by nitrogen. A mixture composed of 330 parts of methyl methacrylate, 10 parts of methyl acrylate and 0.4 part of tert.-dodecylmercaptane was added dropwise to the charge of the reactor over a period of one hour in a nitrogen atmosphere under agitation at a temperature maintained at 80°C. The reaction mixture was further agitated at 80°C. for 4 hours to obtain a methacrylic resin latex.

b. Preparation of Thermoplastic Resin Composition (Impact Resistant Methacrylate Resin):

The methacrylic resin latex obtained in (a) above and 287 parts (about 91 parts as polymer) of the graft copolymer latex obtained in the same manner as described in (a) of Example 3 were mixed in the latex state. The mixture was salted out, washed and dried to obtain a powdery thermoplastic resin composition.

The resin composition obtained was injection molded at 230°C. to obtain an opaque molded product. The mechanical properties of this product at 23°C. are given in Table 4.

Table 4

| | |
|---|---|
| Rockwell R hardness: | 115 |
| Izod impact strength (with notch) | 7.4 Kg.cm/cm$^2$ |
| Tensile strength at yield point: | 518 Kg/cm$^2$ |
| Tensile strength at breakage: | 462 Kg/cm$^2$ |

Example 7 a. Preparation of Substratum Polymer (Acrylic Rubber Latex):

The same reactor as used in (a) of Example 1 was charged with 960 parts of deionized water, 4.32 parts of sodium dodecylbenzene sulfate, 0.81 part of potassium persulfate and 3.22 parts of sodium hydrogen sulfite, and a monomeric mixture composed of 480 parts of n-butyl acrylate, 38.4 parts of acrylonitrile and 20.9 parts of MAM was added dropwise to the charge of the reactor over a period of 20 minutes in a nitrogen atmosphere at a temperature maintained at 35°C. After completion of the dropwise addition, the reaction mixture was agitated at 35°C. for 3 hours to obtain a substratum polymer latex (acrylic rubber latex). Conversion of the monomeric mixture was 97 %. b. Preparation of Graft Copolymer (Acrylonitrile Copolymer Latex):

To the same reactor as used in (a) of Example 1 were charged 1000 parts of the substratum polymer latex obtained in (a) above, 500 parts of deionized water, 6.9 parts of sodium dodecylbenzene sulfate, 0.69 part of potassium persulfate and 1.38 parts of sodium hydrogen sulfate, and a monomer mixture composed of 57.5 parts of methyl acrylate and 172.5 parts of acrylonitrile was added dropwise to the charge of the reactor under agitation over a period of 20 minutes in a nitrogen atmosphere at a temperature maintained at 35°C. After completion of the dropwise addition, the reaction mixture was agitated at 35°C. for 3 hours to obtain a copolymer latex. The conversion of the monomers was about 93 %. c. Preparation of Acrylonitrile-Methyl Acrylate Copolymer Latex:

The same reactor as employed in (a) of Example 1 was charged with 1000 parts of deionized water, 13 parts of sodium lauryl sulfate, 0.75 part of potassium persulfate and 1.5 parts of sodium hydrogen sulfite, and the inside atmosphere of the reactor was replaced by nitrogen. In a nitrogen atmosphere a monomeric mixture composed of 375 parts of acrylonitrile, 125 parts of methyl acrylate and 3 parts of tert.-dodecylmercaptan was added dropwise to the charge of the reactor over a period of one hour at a temperature maintained at 35°C. After completion of the dropwise addition, the reaction mixture was agitated at 35°C. for 6 hours to obtain a copolymer latex. The conversion of polymerization was about 95 %. d. Preparation of Thermoplastic Resin Composition (Impact Resistant Acrylonitrile-Acrylate Resin):

200 parts (calculated as polymer) of the graft copolymer obtained in (b) above and 1000 parts (calculated as polymer) of the acrylonitrile copolymer obtained in (c) above were mixed in the latex state. The mixture was salted out, washed and dried to obtain a thermoplastic resin composition.

The resin composition obtained was press molded at 150°C. to obtain a rod. The Izod impact strength (with notch) of the rod, measured in accordance with the method of ASTM D-256, with 14 Kg.cm/cm$^2$.

Example 8 a. Preparation of Substratum Polymer (2-Ethylhexyl Acrylate Rubber Latex):

The same reactor as employed in (a) of Example 1 was charged with 200 parts of deionized water, 2 parts of sodium lauryl sulfate and 0.5 part of potassium persulfate, and the inside atmosphere of the reactor was replaced by nitrogen. A monomeric mixture composed of 100 parts of 2-ethylhexyl acrylate, 8 parts of acrylonitrile and 4 parts of MAM was added dropwise under agitation to the charge of the reactor over a period of 22 minutes at a temperature maintained at 70°C. After completion of the addition, the reaction mixture was agitated at 70°C. for 5 hours to obtain a substratum polymer. The conversion of the monomers was about 97 %. b. Preparation of Thermoplastic Resin Composition (Vinyl Chloride Resin):

A stainless autoclave was charged with 100 parts of deionized water, 0.13 part of lauroyl peroxide, 0.5 part of tert.-dodecylmercaptan, 5 parts of a 5 % aqueous solution of polyvinyl alcohol (saponification degree: about 85 %, saponification value: about 120) and 65 pats of the latex obtained in (a) above. The inside atmosphere of the autoclave was replaced by nitrogen, and then 100 parts of a vinyl chloride monomer was introduced thereinto. The reaction was continued under agitation over a period of 8 hours at a temperature maintained at about 75°C. After removal of unreacted vinyl chloride monomer, the resulting slurry was filtered, washed and dried to obtain 110 parts of a thermoplastic resin composition.

Using the resin composition thus obtained, a molded product was prepared in the same manner as in (d) of Example 2. The Izod impact strength of the product, measured in accordance with the method of ASTM D-256, was 32 Kg.cm/cm$^2$.

Example 9 a. Preparation of Seed Latex:

Procedures of (a) of Example 4 were repeated in the same manner except that 98 parts of styrene was used instead of 94 parts of styrene and 4 parts of MAM, to obtain a styrene copolymer latex. Conversion of the monomers was 98 %. b. Preparation of AAS Polymer:

The same reaction as used in (a) of Example 1 was charged with 60 parts of the latex obtained in (a) above, 70 parts of deionized water, 0.9 part of sodium lauryl sulfate and 0.15 part of potassium persulfate, and in a nitrogen atmosphere a monomer mixture composed of 30 parts of butyl acrylate and 1.16 parts of MAM was added dropwise to the charge of the reactor over a period of 18 minutes under agitation at a temperature maintained at 70°C. After completion of the dropwise addition, the reaction mixture was agitated at 70°C. for 60 minutes to obtain a substratum polymer latex.

A similar graft copolymer that obtained in Example 4, was obtained at a high grafting efficiency from the so obtained substratum polymer having the polystyrene nucleus in the central portion. Utilizing the procedure of (d) of Example 4, an AAS composition comprising the graft copolymer thus obtained and the styrene copolymer having similar mechanical properties as in Example 4 was obtained.

EXAMPLE 10

Procedures of (b) of Example 9 were repeated in the same manner except that a polyvinyl chloride latex was used instead of the polystyrene latex, to obtain similar results.

Example 11

Procedures of (b) of Example 9 were repeated in the same manner except that an ethylene-vinyl acetate copolymer latex was used instead of the polystyrene latex, to obtain similar results.

Example 12

Procedures of (b) of Example 9 were repeated in the same manner except that a polybutadiene latex was used instead of the polystyrene latex, to obtain similar results.

Example 13

Procedures of (b) of Example 9 were repeated in the same manner except that a natural rubber latex was used instead of the polystyrene latex, to obtain similar results.

What is claimed is:

1. A thermoplastic resin composition comprising (1) 2 to 60% by weight of a graft copolymer (GP) prepared by graft copolymerizing a monomer mixture (C) comprising styrene and acrylonitrile with a substratum polymer (AB) having pendant double bonds prepared from 0.1 to 20.0% by weight of at least one comonomer (A) expressed by the general formula

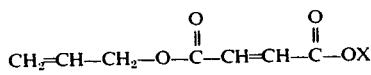

wherein
X is a hydrogen atom, an alkyl group having 1 to 18 carbon atoms, a hydroxyethyl group, a hydroxypropyl group or an aminoethyl group,
50 to 99.9% by weight of at least one ethylenically unsaturated monomer (B-1) selected from the group consisting of alkyl acrylates having 1 to 12 carbon atoms in the alkyl portion, and 0.0 to 49.9% by weight of at least one other unsaturated monomer (B-2), and 2. 40 to 98% by weight of a thermoplastic copolymer (T.P.) prepared by copolymerizing a mixture comprising styrene and acrylonitrile.

2. The composition of claim 1 wherein said unsaturated monomer (B-1) is at least one monomer selected from the group consisting of alkyl acrylates having 2 to 8 carbon atoms in the alkyl portion.

3. The composition of claim 1 wherein said substratum polymer (AB) is a polymer prepared by emulsion polymerization.

4. The composition of claim 1 wherein said substratum polymer (AB) is a polymer prepared by emulsion polymerization in the presence of a seed latex.

5. A thermoplastic resin composition comprising
1. 2 to 60% by weight of a graft copolymer (GP) prepared by graft-copolymerizing styrene with a substratum polymer (AB) having pendant double bonds prepared from 0.1 to 20% by weight of at least one comonomer (A) expressed by the general formula

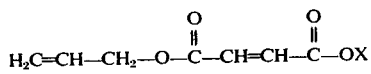

wherein
X is a hydrogen atom, an alkyl group containing 1 to 18 carbon atoms, a hydroxyethyl group, a hydroxypropyl group or an aminoethyl group, and 50 to 99.9% by weight of at least one other ethylenically unsaturated monomer (B) selected from the group consisting of alkyl acrylates having 2 to 8 carbon atoms in the alkyl portion, and 2. 40 to 98% by weight of a thermoplastic copolymer (TP) prepared copolymerizing a mixture comprising styrene and acrylonitrile.

6. The composition of claim 1 wherein the thermoplastic copolymer (TP) is a copolymer of about 70% by weight of styrene and about 30% by weight of acrylonitrile.

* * * * *

UNITED STATES PATENT OFFICE
CERTIFICATE OF CORRECTION

Patent No. 3,898,301  Dated August 5, 1975

Inventor(s) KONISHI ET AL.

It is certified that error appears in the above-identified patent and that said Letters Patent are hereby corrected as shown below:

In the heading, the assignment should read as follows:

-- Nippon Shokubai Kagaku Kogyo Co., Ltd.

In the claims, correct the following:

Claim 1, column 17, line 22: delete " 2.40 " and insert -- (2) 40 --

Claim 5, column 18, line 5: delete " 1.2 " and insert -- (1) 2--
Column 18, line 24: delete " 2.40 " and insert --(2) 40 --

Signed and Sealed this thirtieth Day of September 1975

[SEAL]

Attest:

RUTH C. MASON
Attesting Officer

C. MARSHALL DANN
Commissioner of Patents and Trademarks